United States Patent
Bender

(10) Patent No.: US 7,739,102 B2
(45) Date of Patent: Jun. 15, 2010

(54) RELATIONSHIP ANALYSIS SYSTEM AND METHOD FOR SEMANTIC DISAMBIGUATION OF NATURAL LANGUAGE

(76) Inventor: Howard J. Bender, 4200 Sheridan St., University Park, MD (US) 20782

( * ) Notice: Subject to any disclaimer, the term of this patent is extended or adjusted under 35 U.S.C. 154(b) by 273 days.

(21) Appl. No.: 10/571,760

(22) PCT Filed: Oct. 7, 2004

(86) PCT No.: PCT/US2004/033042
§ 371 (c)(1), (2), (4) Date: Mar. 13, 2006

(87) PCT Pub. No.: WO2005/033909
PCT Pub. Date: Apr. 14, 2005

(65) Prior Publication Data
US 2007/0083359 A1 Apr. 12, 2007

(51) Int. Cl.
*G06F 17/27* (2006.01)
(52) U.S. Cl. .................... 704/9; 704/2; 704/4; 704/238; 704/273; 707/3; 706/14
(58) Field of Classification Search .................... 704/9, 704/4, 273, 238, 2; 707/3; 706/14
See application file for complete search history.

(56) References Cited

U.S. PATENT DOCUMENTS

| | | | | |
|---|---|---|---|---|
| 4,468,756 A * | 8/1984 | Chan | ............... | 704/4 |
| 4,706,212 A * | 11/1987 | Toma | ............... | 704/2 |
| 5,495,413 A * | 2/1996 | Kutsumi et al. | ............... | 704/4 |
| 5,510,981 A * | 4/1996 | Berger et al. | ............... | 704/2 |
| 5,687,384 A * | 11/1997 | Nagase | ............... | 704/9 |
| 5,696,980 A * | 12/1997 | Brew | ............... | 704/273 |
| 5,768,603 A * | 6/1998 | Brown et al. | ............... | 704/9 |
| 5,842,159 A * | 11/1998 | Nakamura et al. | ............... | 704/4 |
| 5,960,384 A | 9/1999 | Brash | | |
| 6,094,634 A * | 7/2000 | Yahagi et al. | ............... | 704/260 |
| 6,173,275 B1 * | 1/2001 | Caid et al. | ............... | 706/14 |
| 6,292,771 B1 * | 9/2001 | Haug et al. | ............... | 704/9 |
| 6,356,864 B1 | 3/2002 | Foltz et al. | | |
| 6,446,061 B1 * | 9/2002 | Doerre et al. | ............... | 1/1 |
| 6,484,136 B1 * | 11/2002 | Kanevsky et al. | ............... | 704/9 |
| 6,556,964 B2 | 4/2003 | Haug et al. | | |

(Continued)

OTHER PUBLICATIONS

International Search Report Application PCT/US04/33042 dated Oct. 23, 2007.

*Primary Examiner* — Talivaldis Ivars Smits
*Assistant Examiner* — Michael C Colucci

(57) ABSTRACT

A system, method, and computer program product for domain-independent natural language understanding, including at least one of forming pairs of words and/or phrases in a sentence, wherein each word and/or phrase is paired with every other word and/or phrase; determining meanings for the words and/or phrases; assigning numeric codes that uniquely identify semantic concepts to those word and/or phrase meanings; comparing the numeric code of each word and/or phrase with each numeric code of the other word and/or phrase in the pair; selecting the pairs with the best relationships; combining highly-related pairs with other highly-related pairs to form longer groups of words; exchanging numeric codes for the longer groups with numeric codes having a weaker relationship to determine if the exchanged numeric codes provide an overall stronger relationship; and forming longer and longer groups until the sentence is understood.

27 Claims, 4 Drawing Sheets

U.S. PATENT DOCUMENTS

| | | | |
|---|---|---|---|
| 6,594,658 B2 * | 7/2003 | Woods | 707/5 |
| 6,601,026 B2 * | 7/2003 | Appelt et al. | 704/9 |
| 6,615,172 B1 * | 9/2003 | Bennett et al. | 704/257 |
| 6,647,383 B1 * | 11/2003 | August et al. | 707/3 |
| 6,697,793 B2 * | 2/2004 | McGreevy | 707/1 |
| 6,760,714 B1 * | 7/2004 | Caid et al. | 706/14 |
| 7,072,826 B1 * | 7/2006 | Wakita | 704/2 |
| 2003/0004716 A1 * | 1/2003 | Haigh et al. | 704/238 |
| 2007/0219774 A1 * | 9/2007 | Quirk et al. | 704/2 |

* cited by examiner

RELATIONSHIP ANALYSIS SYSTEM AND METHOD FOR SEMANTIC DISAMBIGUATION OF NATURAL LANGUAGE

BACKGROUND OF THE INVENTION

1. Field of the Invention

The present invention generally relates to methods and systems for natural language understanding (NLU), and more particularly to a method and system for relationship analysis for semantic disambiguation of natural language. The present invention can include one or more technologies described and referenced throughout the present specification in brackets and listed in the LIST OF REFERENCES, the entire disclosures of which are incorporated by reference herein.

2. Discussion of the Background

Current approaches to natural language understanding (NLU) involve statistical analyses to select meanings from a "world knowledge" database, to interpret the contextual meaning of messages. Natural language understanding can include the analysis of communication between a speaker and a listener, whether those individuals are communicating via literature, voice or another medium. The listener interprets the intentions of the speaker, picking the one meaning for each of the words and/or phrases that best matches the overall meaning of the message. Since people do this with apparent ease, the approach to computerizing NLU typically has been to mimic the human communications environment. Such an environment has been assumed to be based on the world knowledge of the listener, gleaned from a lifetime of experiences.

For more than 10 years, a major research effort has been undertaken to collect, categorize, and store this massive amount of often contradictory world knowledge information. However, the best analyses seem to rely on statistical methods, and nearly all NLU research in recent years has been to find the most successful statistical approach. But what if human communication does not rely on the analysis by the listener of the intentions of the speaker at all? What if the speaker, in the construction of the message, has (invisibly) inserted the actual single meaning of each word and/or phrase within the message? Then, the listener can extract such natural intelligence from the message and recognize the overall meaning from the collection of individual meanings. In other words, for sensible sentences the listener does not need world knowledge, and computers do not need such knowledge either.

Consider the following sentence:

They met at the bank.

Such a sentence is ambiguous and therefore cannot be understood. For NLU (either human or machine) to be successful, the sentence must be further explained, such as:

They met at the bank to withdraw money.

They met at the bank where the fishing was best.

They met at the bank of spotlights.

As these examples illustrate, a message is ambiguous unless each of the words and/or phrases has a single distinct meaning. That meaning, that natural intelligence, makes sense if the speaker constructed the message with distinct meanings for each word and/or phrase, otherwise the message would be ambiguous and neither human nor computer could understand the message. The following Table lists the major approaches to NLU for which projects have been attempted and results have been published in peer-reviewed journals.

TABLE

Major Approaches to natural language understanding (NLU).

| Approach | Description |
|---|---|
| Case Grammar | Syntactical relationship of a noun, pronoun, or adjective to other words |
| Conceptual Dependency | Concept relationships between words |
| Dependency Analysis | Relationships making some words dependent on the meaning of others |
| Fulcrum Analysis | Recognition of grammatical patterns |
| Heuristic Parsing | Based on punctuation, prepositions, and conjunctions |
| Lexical Analysis | Based on the words or phrases and definable items in a vocabulary, irrespective of grammar |
| Logical Analysis | Uses common sense inference rules to understand what is meant |
| Morphological Analysis | Based on the smallest meaningful unit of a language |
| Number Language Processing | Transforms words into numeric strings for computer processing |
| Philosophical Analysis | Considers the thoughts behind the meaning, rather than the words themselves |
| Pivot Language | Creation of an artificial language in place of a natural language |
| Predictive Syntax | Makes predictions about the category of a word from earlier words |
| Preference Semantics | Includes procedures for natural language understanding |
| Principle-Based | Grammar is viewed as principles rather than rules |
| Semantic Analysis | Based on the meaning of words or phrases |
| Semantic Grammar | Groups of semantic factors are used to indicate syntactic elements |
| Statistical Analysis | Based on probabilistic analysis of relationships between words or phrases |
| Syntactic Analysis | Based on the grammatical relationships of words and phrases |
| Text Prediction | Anticipates what the following words mean based on past words |
| Transfer | Systems using an intermediate language to describe the source language before final translation |
| Word Expert | Each word is understood in context with the others |

The topics most relevant to the present invention include conceptual dependency, dependency analysis, lexical analysis, number language, semantic analysis, semantic grammar, statistical analysis, transfer systems, and word experts. Many of these studies are combinations of the linguistic approaches shown in the above Table.

To appreciate the historical perspective of useful NLU theories and suggestions that were abandoned because it was too much trouble to convert them to the latest computers, this review describes projects in a time ordered sequence within the general linguistic approach. The linguistic approaches are semantics-based systems, category-based systems, interlingual systems, artificial intelligence systems, and statistical systems. The systems were all developed for machine translation (MT) because that was (and still is) the area of natural language understanding of interest to funding organizations.

Research using syntactic, semantic, and morphological rules known at the time was done at Georgetown University from 1952-1963. This project found that:

1. Pre- and post-editing were not necessary;
2. The main problem was linguistic analysis;
3. Semantic feature codes were needed in dictionaries;
4. Intermediate languages for multilingual systems seemed feasible.

These investigations resulted in the Georgetown Automatic Translation (GAT) system, capable of limited translation of French, Russian, and Chinese to English (Dostert, 1955 [8]; Zarechnak & Brown, 1961) [55].

A replacement for the GAT system was developed by Latsec, Inc., in the mid-1960s. This bilingual system (Russian/English, French/English, Italian/English), named Systran, was used by the National Aeronautics and Space Administration (NASA) during the Apollo-Soyuz mission with Russia. The main components of Systran were two bilingual dictionaries (single word and multi-word) containing grammatical and semantic information. In addition, a high frequency dictionary, a limited semantics dictionary, a conditional limited semantics dictionary, and a main dictionary were referenced. Syntactic analysis required seven passes through the source language, as follows:

1. Resolution of homographs;
2. Identification of compound nouns;
3. Identification of phrase groups;
4. Recognition of primary syntactic relations;
5. Identification of coordinate structures within phrases;
6. Identification of subjects and predicates;
7. Recognition of prepositional structures.

Organization seemed to be the main problem with Systran. Information about either the source or target language lexicons or grammar was included in any mixture that seemed convenient. As a consequence, there was no uniformity, the methods were inconsistent, coverage and quality were uneven, and modifications of one section of the dictionary often had unexpected consequences in other parts of the system (Pigott, 1983 [35]). Also, the raw output of English to French was considered inadequate to provide detailed information to a French reader (Arthem, 1979 [3]). Nonetheless, Systran produced (and continues to produce) successful limited translations, and the system is still under development. For example, Xerox Corporation is using Systran to improve the clarity of their manuals (Hutchins, 1991 [17]), and the European Union is using it to aid their translation of documents (Reid, 2002 [37]).

Other work based on GAT was done at the Pan American Health Organization in the mid-1970s. Two working systems, ENGSPAN for translating English to Spanish, and SPANAM for translating Spanish to English, were developed. These systems used separate source language and target language dictionaries linked by lexical numbers and semantic markers (human, mass, etc.), and the mainframe computer system was integrated with a word processor. These systems do not deal with disambiguation beyond syntactic homographs, and post editing is essential (Vasconcellos, 1985 [47]).

Dependency analysis for Russian-to-English translations was investigated at the RAND Corporation from 1957-1960 (Hays, 1967 [15]). In this system, the relationships between words were determined by a series of iterations through the text. For example, in "He ate the green pepper" the relationship of "pepper" to "ate" was established after "green" to "pepper." This project was limited by lack of a computational linguistic theory and never resulted in an operational system.

Investigations into common syntagmatic structures (possession, etc.) for Hungarian-to-Russian translations were carried out at the Institute of Linguistics, Moscow from 1955-1967. This program chose Hungarian as the translating language due to the special difficulties it shared with English, German, and the Turkic languages. Algorithms for morphological analysis, dictionary searching, homograph resolution, and recognition of sentence structure were given special emphasis. An attempt was made to produce theoretical sets of interlingual semantic features (Papp, 1966 [34]).

The fulcrum method of analysis for Russian-to-English translation was investigated at the Ramo-Wooldridge Corporation from 1958-1967. This project was designed for linguistic studies emphasizing semantics. Researchers tried to solve problems that occur frequently, not those of greatest intellectual difficulty. The system started with a crude word-for-word translation, followed by a syntactic analysis from grammatical information provided by the dictionary. Multiple meanings of words were eliminated, and idioms were recognized. The approach was problem-solving rather than theory-oriented. The fulcrum parser, essentially a linguistic pattern recognition algorithm to identify grammatical patterns, required strict sequencing for the searches and was language-specific (Garvin, 1968 [11], 1980 [12]; Mersel, 1961 [29]).

An ambitious German-to-English (later interlingual) project was begun at the University of Texas Linguistics Research Center (LRC) in 1958. This project was designed as a typical transfer system, in which the source language is analyzed, transferred to an intermediate form, and synthesized into the target language. The LRC model emphasized semantic translation, establishing bi-directional phrase-structured analyses of the source and target languages lexical senses.

A fully automatic interlingual system was attempted after 1970, based on the universal base hypothesis in which the surface structure of any language can be related to a universal base. The ultimate goal was a system which could recognize and produce synonymous sentences by deriving canonical form (i.e. semantic interlingual) representations from sentences and generating all surface realizations of such representations. The LRC could not overcome differences they found in world views reflected in the vocabularies and semantic relationships of languages.

After 1978 the various research projects were collected into the Mechanical Translation and Analysis of Languages (METAL) system for translating telecommunication and data processing texts. METAL is not fully automatic (post-editing is required) and is bilingual rather than interlingual. The LRC concluded that an MT interlingua or pivot language is probably impossible (Hutchins, 1986 [16]; White, 1985 [48]).

A German-to-English MT system with interlingual intentions was investigated at the Forschungsgmppe Linguistik und Maschinelle Sprachverarbeitung (LIMAS) in Bonn, West Germany from 1964-1976. The basic premise was that computer natural language processing, including MT, must be based on a language-independent semantic syntax, a communicative grammar, expressing content elements and their relations. A classification of content elements or semantic factors was developed (about 80 factors). Translation involved the comparison and matching of matrices of coded factors both between and within languages. In reality, the research became bogged down in the laborious establishment of a lexicon of semantic factors and the construction of factor matrices for English and German vocabulary (Lehmann & Stachowitz, 1972 [26]).

A rather successful transfer-based approach was pursued at the University of Montreal, Traduction Automatique de l'Universite de Montreal (TAUM) in the 1970's. Two systems were developed. TAUM-METEO was limited to English-to-French translations of public weather forecasts; TAUM-AVIATION was an English-to-French translation of aircraft maintenance manuals. METEO implemented a semantic grammar in which rules operated on semantic categories. The system was limited in scope and used a very restricted language subset, failing to translate only 20% of unedited reports mostly because of human typing errors. Failures from non-recognition of syntactic patterns were very rare. METEO was the only MT system regularly producing translations, which were not edited before being made available to the public.

AVIATION was much more ambitious with a larger range of language. Although initial results were promising, the project ran out of development time and was canceled (Isabelle & Bourbeau, 1984 [18]; Thouin, 1982 [44]).

Studies on the effects of context versus definition for vocabulary retention of English for speakers of other languages (ESL) students were conducted by Markham (1989 [28]). He found that context-imbedded vocabulary exercises facilitate better long-term retention of words, however knowledge of the definition of a word is important in the initial phase of vocabulary development. Contextual meaning is also the natural word-building method observed in reading.

Research using the predictive syntactic analyzer approach was done for a Russian-to-English translation system at the National Bureau of Standards (NBS) from 1959-1963 (Rhodes, 1961 [39]). In this project, grammatical, lexical, and physical predictions were made for words further in a sentence by using categories and the success of earlier predictions. Only some syntactic problems were studied; semantic difficulties were considered to be beyond MT. The investigators concluded that only sentence parsing is mechanizable.

A theoretical investigation of interlingual semantic analysis using a thesaurus approach was pursued at Cambridge University, England from 1956-1967. With the goal of producing good-quality fully automatic idiomatic translations, the Cambridge Language Research Unit (CLRU) developed a structured conceptual classification of vocabulary as the basis for an interlingua Words were separated into lexical items (stems) and grammatical operators (e.g., endings or function words). The lexical items were accessed in the dictionary. The researchers concluded that a phrase-by-phrase translation might be a more natural approach than traditional sentence-by-sentence translation. This research was hampered by the lack of access to a computer and the difficulty with synonymy, polysemy, and the establishment of proper interlingual semantic components (Needham & Joyce, 1958 [31]). Tosh (1969 [45]) suggested using the categories already contained in Roget's Thesaurus to overcome these difficulties. Begun in 1805, Roget's Thesaurus has classified English words semantically into general classes and associated categories. Tosh pointed out that the various meanings of a word are given distinct numerical identifiers in the thesaurus that include considerably more detail than might be assumed at first glance. Using a thesaurus as a basis for MT, however, was never pursued.

The U.S.S.R. has pursued theoretical interlingual investigations at the First Moscow State Pedagogical Institute of Foreign Languages since 1957 and at the Leningrad University Experimental Laboratory of Machine Translation (ELMP) since in 1958. The Moscow program involved semantic analyses in which relationships were devised from dictionary entries of words formed as combinations of elementary semantic factors and relations. The emphasis was on problems of synonymy and paraphrase rather than homonymy, and on subtle semantic differences rather than crude lexical transfer (Zholkovskii, Leont'eva, & Martem'yanov, 1961 [56]).

The Leningrad program proposed an interlingua that was a complete artificial language, including morphology and syntax. Decisions about the inclusion of particular features were to be based on the averaging of phenomena of various languages with preference given to the major languages manifesting those features. Although the synthesis was for Russian only, theoretical studies were done for Russian, Chinese, Czech, German, Rumanian, Vietnamese, Serbo-Croatian, English, French, Spanish, Norwegian, Arabic, Hindustani, Japanese, Indonesian, Burmese, Turkish, and Swahili (Andreev, 1967 [2]; Papp, 1966 [34]). The strategy of using an artificial language to model natural language was bound to fail because natural languages, in contrast to artificial languages, are nondeterministic, ambiguous, and largely unrestricted (Su & Chang, 1990 [43]).

The Cambridge Language Research Unit studies on phrase-structured semantic grammars were continued at Stanford University from 1970-1974. In an artificial intelligence (AI)-oriented interlingual MT system, semantic frame templates based on triples of semantic features were used. The approach was purely semantic using common-sense inference rules. No syntactic structures (not even the boundaries of sentences) were considered. As a result, discourse analysis across sentence boundaries was a natural feature of the system (Wilks, 1972 [49], 1973 [50], 1975 [51]).

A more recent phrase-structured semantic MT system is under development for the Indian languages in the Dravidian family group (Tamil, Telugu, Kannada, Malayalam) and the Indo-European family group (Hindi, Punjabi, Gujarathi, and Bengali). This system is centered on using verbs to delimit sentence phrases and to build the representational structure. The meaning of the verbs is determined by using a frame template analysis but, unlike the CLRU system, syntactic analysis is also included (Raman & Alwar, 1990 [36]). As in other frame-based systems, until a large number of real world descriptions have been included in the knowledge base, the vocabulary is severely restricted.

The only MT project using a full-fledged interlingua as an intermediate language has been pursued at the Buro Voor Systeemontwikkeling, Utrecht, Holland since 1979. The intermediate language is Esperanto. MT processing involves a direct translation of the source language to Esperanto and a transfer from Esperanto to the target language. The system emphasizes technical material translations using artificial intelligence in a word processing environment with personal computers, but the lack of technical vocabulary in Esperanto has been a problem. A working system, named DLT (Distributed Language Translation), was developed using the computer language Prolog and tested for English-to-French translations. The long-term aim is a multilingual system for translation between European languages (French, German, English, Italian), with eventual extensions to other languages (Japanese, Chinese, Arabic) (Papegaaij, Sadler, & Witkam 1986 [33]; Witkam, 1984 [52]).

Another interlingual MT system based on a word processing environment has been under development at Logos Corporation since 1982. A working product, the Logos Intelligent Translation System using a proprietary Semantic Abstraction Language, has been shown to translate over 20,000 words in 24 hours. Dynamic dictionary software asks questions concerning the syntactic and semantic properties of unknown words and ensures compatibility with the rest of the dictionary. Semantic information is categorized and put in a hierarchical tree structure, with source language and target language data separation. This system works best with highly specialized texts, generating less clear translations for general correspondence material (Hawes, 1985 [14]; Tschira, 1985 [46]).

The Commission of the European Communities also started an interlingual project, named EUROTRA, in 1982. It was conceived as a distributed system, with researchers in each of the member countries responsible for translating from their own languages into a common linguistic representation. A modest transfer component for each language pair was intended, but never realized. This project coordinates the work of about 150 researchers in 12 countries, and progress has been disappointingly slow. Work continues, however, as a basis for continued research and because no other project seems to be better (Hutchins, 1991 [17]).

An interlingual approach based on philosophical, rather than linguistic, foundations was considered at the University of Milan from 1959-1966. In this approach, the contents of thought were regarded as activities and not, as in traditional philosophy, as objects. Four fundamental operations were identified; differentiation, figuration, categorization, and correlation. The researchers contended that since traditional linguistics could not deal with discontinuous structures or with homography and polysemy, additional linguistic theory was needed before machine translation was possible. The new theory that resulted was an early version of conceptual dependency networks (Shank, 1975 [40]), in which correlation conditions and classifications were proposed. Unfortunately, nearly all correlations were open for certain words. The system only translated three small examples of Russian-to-English sentences. The philosophical foundations proposed could be interpreted as grammatical categories and classifications, and the correlational grammar was effectively just another version of phrase structure grammar (Albani, Ceccato, & Maretti, 1961 [1]; Ceccato, 1966 [6], 1967 [7]).

Artificial intelligence interlingual approaches have been investigated since 1973 at the Institut fur Angewandte Sprachwissenschaft, University of Heidelberg, West Germany; since 1975 at Kyoto University in Japan; and from 1984-1987 at the Centre for Computational Linguistics at the University of Manchester Institute of Science and Technology (UMIST), and at the University of Sheffield, England. Results from these efforts have formed the basis for many of the current commercial R&D projects.

In the Heidelberg project, the interlingual features are restricted to syntactic (based on logico-semantic foundations) and structural relations. A working system named SALAT (System for Automatic Language Analysis and Translation) has been developed using knowledge database and inference rule aspects of AI. The clear objective is to devise logical formulae both for the deep structure component of transformational grammar and for knowledge base representations, both using an interlingua (Hauenschild, Huckert, & Maier, 1979 [13]).

The relevant Kyoto research includes two different approaches. The first project is an experimental interactive English/Japanese system, written in LISP, using a logico-semantic interlingua based on Montague's semantic theory (Montague, 1974 [30]). The second approach is a learning MT system, with the system developing it's own analysis based on the sentences presented to it (Hutchins, 1986 [16]).

The British effort intended to use the computer to help in translation, rather than as an independent translator. Based on the transfer approach with an interlingua for future expansion and written in Prolog, this system required human support for resolving ambiguities. Pre-editing, post-editing, and interactive assistance was used, in which the computer displayed alternative parses and requested the user to select the correct one (Wood, 1991 [53]).

The classical conceptual dependency theory was developed at Yale University from 1978-1982 as the foundation for an interlingual semantic-based artificial intelligence MT system. This theory asserts that human language understanding represents meaning in primitive semantic relationships (conceptual dependencies), expressing both explicit information and implied/inferred information. These relationships may be described with language-independent scripts which produce retellings rather than translations. In this theory, it is more important to convey the sense unambiguously than to preserve the structure and style of the original. A working system, named MOPTRANS (Memory Organization Packets-based Translator), was developed (Carbonell, Cullingford, & Gershman [4], 1981; Shank, 1975 [40]).

Conceptual dependency research was continued at the Georgia Institute of Technology beginning in 1982 under Richard Cullingford. Designed as an interlingual system, the first application of this work was for Ukrainian-to-English translations. The approach uses lexical entries containing information on case, gender, number, and semantic knowledge to predict and build representations. This system uses AI techniques with a refinement of case-frame parsers without the syntactic information, and is closely related to the word expert systems (Small, 1983 [41]).

Ishikawa, Izumida, Yoshio, Hoshiai, & Makinouchi (1987 [19]) are using a domain model, linguistic knowledge, and a database mapping scheme (collectively called a knowledge base) to semantically interpret queries. By continuously culling the possible areas of search, they try to avoid combinatorial explosion (a rapidly increasing number of possible combinations), the most common problem in semantic processors. An eventual goal for semantic processing systems is to make expert systems easier to use.

A more substantial knowledge-based effort to understand and translate sentences has been started by the Defense Advanced Research Project Agency (DARPA) and involves the complimentary expertise of three universities. New Mexico State University has two tasks, building vocabularies and parsing sentences; Carnegie-Mellon University is concentrating on the concept lexicons; and the University of Southern California is developing routines to translate an interlingua into a target language (Stone, 1991 [42]). The system, called Pangloss, is intended to produce flawless translations of documents as complex as newspapers articles from Spanish, German, and Japanese into English.

A practical attempt at word-for-word translation was pursued at the IBM Thomas J. Watson Research Center from 1958-1966. English was the target language, with Russian, French, and Chinese as source languages. The method of best equivalents based on probabilistic criteria with some backtracking was used to try to produce something readable. No attempt was made to attack hard linguistic problems. The system had difficulty with syntactic parsing and encountered considerable problems in semantics. The result was a translation with poor clarity that required extensive post-editing (Kay, 1973 [21]).

Attempts to predict the meaning of future words based on selected meanings of past words are current research efforts at the University of Montreal (Langlais, et al., 2000 [24]; Foster et al., 2002 [10]). Intended as a tool to speed translation by humans, the prototype system seems to have had the opposite effect. This is probably because system selections sometimes do not correspond with translator expectations, requiring additional work by them. Efforts at improving the statistical model continue. Additional work at the University of Illinois (Even-Zohar & Roth, 2000 [9]) has tried to provide a focus of attention mechanism to help the statistical prediction.

Statistical studies with parallel English and French texts are currently being undertaken by the Thomas J. Watson Research Center at IBM. Hundreds of millions of words from the Canadian Parliament's English and French proceedings are being placed in a computer database to find statistical relationships between words. New texts refer to this statistical knowledge to yield the most probable translation. This system uses no linguistic theory, but is reputed to be quite good within its domain (Hutchins, 1991 [17]; Stone, 1991 [42]).

With similar intentions, DARPA established a Linguistic Data Consortium (now funded by the National Science Foundation) to collect raw text (naturally occurring text from a wide range of sources, 5 to 10 billion words), annotated text (syntactic and semantic labeling of some parts of raw text, upwards of 20 million words), raw speech (spontaneous speech from a variety of interactive tasks, 400 hours, 2000 speakers), read speech (1,000 hours, 10,000 speakers), annotated speech (phonetic and prosodic labeling, 20 hours), a lexicon (a computational dictionary of 200,000 entries plus a term bank containing geographical, individual, and organizational names, 200,000 to 300,000 entries), and a broad coverage computational grammar. All of these sources will be statistically analyzed for both natural language processing and MT (Joshi, 1991 [20]).

A study of how a statistical system performs when translating text far different from the sources used to collect vocabulary and to train it found a significant drop in performance due to unknown words (Langlais, 2002 [25]). The researchers plan to overcome this problem with non-statistical resources.

Classification systems have also been investigated to try to determine text content and to limit the statistical analyses (Even-Zohar & Roth, 2000 [9]; Rennie, 2003 [38]), but the classifications noted have focused on example problems. No comprehensive classification has been proposed.

Theoretical research into the straification of grammar for Russian-to-English MT (and later Russian-to-Spanish and Chinese-to-English) was conducted at the University of California, Berkeley from 1958-1964. The theory posited a series of levels within which and between which linguistic units were related. The levels identified were phonemic, morphemic, lexemic, and sememic. Machine translation was visualized as a system of decoding and encoding through the levels (Lamb, 1961 [22]). The project concentrated on the lexical and semantic aspects of translation, the development of research tools, and maximally efficient routines for dictionary lookup. The major problem seemed to be the resolution of lexical ambiguities (Lamb, 1965 [23]).

Pivot language research projects have dominated efforts at the University of Grenoble since 1961. Artificial pivot languages were developed to avoid the morphological and syntactic problems of natural languages. The Centre d'Etudes pour la Traduction Automatique (CETA) system conjoined the lexical units of whichever two languages were being processed, with as many pivot languages as there were source/target language pairs. The main features were a transfer lexicon between languages, semantic analysis of dependency relations, and an interlingual syntax. The analysis methods were rather rigid, with only 42% of the sentences correctly translated and only 61% comprehensible (Hutchins, 1986 [16]).

The CETA system evolved into the Groupe d'Etudes pour la Traduction Automatique (GETA), a multilingual system in which linguistic data were separated from programming procedures to allow linguists to work with linguistic concepts rather than programming concepts. GETA was particularly strong in morphological and syntactic analysis and transformation, with good quality translations. Major weaknesses were the lack of semantic processing and the non-portable nature of the assembly language in which GETA was written. Investigations into the minimum amount of subject matter understanding necessary to translate a text from Russian to Bulgarian were conducted at the Bulgarian Academy of Sciences from 1964-1976. The premise was that knowledge of how to select the appropriate target language expressions for a given source language text was sufficient. A large part of the research program was devoted to quantitative and statistical studies of Bulgarian, from which the necessary translation information consisting of the basic lexical information and additional contextual information necessary for interpretation was proposed (Ljudskanov, 1968 [27]).

A different approach has been pursued towards a bilingual English/Japanese system at Hitachi in Japan since 1975. Called the Heuristic Parsing Model, the method is based on a non-standard grammar in which detailed parsing is avoided in favor of elementary grammatical knowledge of language learners. English sentences are segmented into phrasal elements and clausal elements on the basis of punctuation, prepositions, and conjunctions. Syntactic pattern matching is used with little consideration for semantic issues. The Hitachi theory is that syntax-directed parsers are best for English, but semantics-based approaches are better for Japanese. A working system, named ATHENE (Automatic Translation of Hitachi from English into Nihongo with Editing Support), has been developed. Ambiguous English constructions and multiple meanings of words are not included, and the system requires post-editing (Nitta, 1982 [32]).

A recent focus has been to identify the correct meaning of specialty terms in languages (Zanger & Stertzbach, 1991). For example, the word chip generally refers to a piece of something, but when used as a chip shot in golf it conveys an entirely different meaning. A computerized dictionary for lexically ambiguous sport terms is under development at Bowling Green State University. While useful to explain the meanings of these words to foreign language learners, this dictionary would not be needed for a machine translation system based on synonym comparisons.

An effort to incorporate advances in speech recognition with MT has resulted in a continuous-speech translation system named Janus for English, German, and Japanese speakers. A collaboration between Siemens A. G., ATR (Kyoto, Japan), the University of Karlsruhe, and Carnegie Mellon's Center for Machine Translation has demonstrated a system with a 400-word vocabulary that helped speakers register for a 1991 conference. Operating on a standard workstation with a relatively slow 7-30 second response time, Janus is based on a neural network and is accurate even when the meaning and sounds of a sentence are not clear (Carlson, 1992 [5]).

However, the various approaches to natural language understanding, as described above, suffer from a range of problems and can involve complex analysis, often based on complex statistical models and relationships, which may be the reason why many of such systems have yet to be commercially exploited.

SUMMARY OF THE INVENTION

Therefore, there is a need for a method and system for domain-independent natural language understanding that need not employ complex analysis based on complex statistical models and relationships. The above and other needs are addressed by the exemplary embodiments of the present invention, which provide a system and method for domain-independent natural language understanding, including an exemplary relationship analysis process by which potential meanings of words and phrases in a sentence can be compared with each other, with a single best relationship of all the words selected as the contextual interpretation of the sentence. The general methodology can include characteristics similar to those used by living cells during DNA replication. Advantageously, the exemplary system and method for natural language understanding need not employ complex analysis based on complex statistical models and relationships.

Accordingly, in exemplary aspects of the present invention, a system, method, and computer program product for domain-independent natural language understanding are provided. The system, method, and computer program product include at least one of forming pairs of words and/or phrases in a sentence, wherein each word and/or phrase is paired with every other word and/or phrase; determining meanings for the words and/or phrases; assigning numeric codes that uniquely identify semantic concepts to those word and/or phrase meanings; comparing the numeric code of each word and/or phrase with each numeric code of the other word and/or phrase in the pair; selecting the pairs with the best relationships; combining highly-related pairs with other highly-related pairs to form longer groups of words; exchanging numeric codes for the longer groups with numeric codes having a weaker relationship to determine if the exchanged numeric codes provide an overall stronger relationship; and forming longer and longer groups until the sentence is understood.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
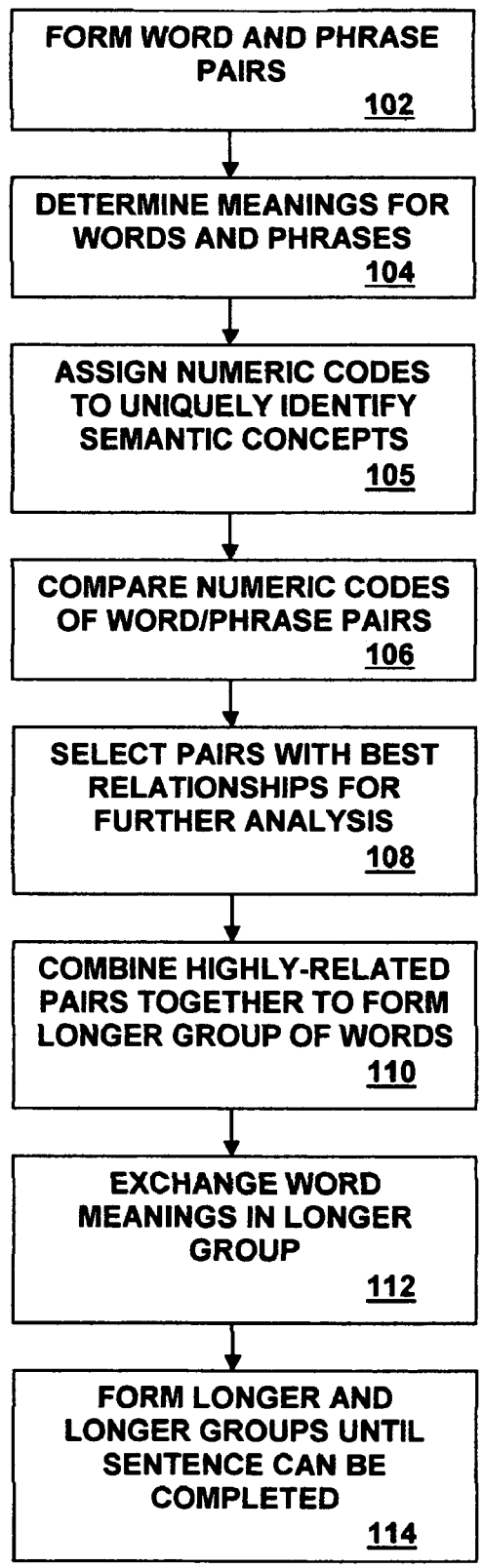
FIG. 1 is a flow chart for illustrating a relationship analysis process, according to an exemplary embodiment.

Referring now to the drawings, wherein like reference numerals designate identical or corresponding parts throughout the several views, and more particularly to FIG. 1 thereof, there is illustrated a flow chart of a relationship analysis process, according to an exemplary embodiment.

In FIG. 1, the exemplary relationship analysis process can be configured to perform language-independent semantic analysis, for example, including, at step 102, forming pairs of legitimate words and phrases in a sentence, wherein each word and/or phrase can be paired with every other word and/or phrase. A step 104, possible meanings for words and phrases can be determined. At step 105, numeric codes that uniquely identify the semantic concepts of the word and/or phrase are assigned. At step 106, the meaning of each word and/or phrase can be compared with each meaning of the other word and/or phrase in the pair by comparing the numeric codes of each word and/or phrase. At step 108, the pairs with the best relationships are selected for further analysis, wherein the same word, with different meanings, can be selected multiple times, if more than one pair has especially strong relationships. At step 110, the highly-related pairs are combined with other highly-related pairs to form a longer group of words. At step 112, for such longer groups, word meanings can be exchanged with those that have weaker relationships to see if the overall result has an overall stronger relationship. At step 114, longer and longer groups can be formed until a sentence can be completed, completing the relationship analysis process.

In an exemplary embodiment, in syntactically-identical sentences with a potential idiom that changes meaning depending on the context, as shown below, relationships can be compared using any suitable ontology, for example, as further described in [57].

1. The hot dog is ready to eat
2. The hot dog is ready to bark

In an exemplary embodiment, the words and/or phrases of the exemplary sentences and their respective possible meanings, as shown below, can be analyzed based on the exemplary relationship analysis process, which can employ an exemplary class/category structure.

the
  1. Specific object—The rain is in Spain.
hot
  1. Fiery—The hot flames held back the firefighters.
  2. Radioactive—The Geiger counter says these rocks are hot.
  3. Heated—The cocoa is hot.
  4. Charged—The electricity is on, so those wires are hot.
  5. Red—Her car is painted hot red.
  6. Lustful—Girls in bikinis made him hot.
  7. Zestful—Those chili peppers are really hot.
  8. Exciting music—That song is hot.
  9. On the right scent—He was hot on the trail of the spy.
  10. Fugitive—The criminal had to hide because he was hot.
  11. Eager—She was hot to find the missing treasure.
  12. Excellent—This product has been a hot seller.
  13. Feverish—The illness gave him hot flashes.
  14. Stolen—The thieves used a hot car for their getaway.
  15. Passionate—The hot topic kept her interest.
  16. Hot-tempered—His moods change from mild to hot.
  17. Angry—The remark that he is dishonest made him hot.
  18. Sexy—She is one hot lady.
dog
  1. Male—Look at that old dog go after those girls.
  2. Canine—Our family dog is a Golden Retriever.
  3. Being dishonorable—He acted like a dog with his parents.
  4. Being ugly—That girl is a real dog.
hot dog
  1. Food—I'm having a hot dog for lunch.
  2. Being pretentious—Look at that hot dog drive that car.
is
  1. Existing—The rain is in Spain.
ready
  1. Make preparations—The team is at the ready.
  2. Willing—She's ready for the guests.
  3. Likely—The airplane is ready to fly.
  4. Immediately available—The kids are ready to go.
  5. A specific position—The soldiers have their rifles at the ready.
  6. Alert—She has a ready wit
to
  1. Toward—He's going to town.
  2. Near—The men were face to face.

3. Intending—Come to my rescue.
4. Resulting in—The animal was frozen to death.
5. Belonging—That's the key to the door.
6. Accompanied by—The band marches to the music.
7. In honor of—Drink to me only with thine eyes.
8. Comparison—There are four quarts to the gallon.
9. Approaching a limit—It's five minutes to one.
10. As far as—He was a miser to the end of his life.
11. Concerning—He was blind to her charms.
12. Close application—They have to buckle down to work.
13. For—The contest is open to everyone.
14. Indirect object—Give the ring to me.
15. By—The problem was known to the world.
16. Point of view—It seems to me that you're right
17. About—That's all there is to it
ready to
1. Inclined—The children are ready to take naps.
eat
1. Nourishment—We're ready to eat dinner.
2. Destroy—Corrosion can eat metal away.
bark
1. Animal sound—Dogs bark at mailmen.
2. Plant covering—Trees are covered in bark
3. Sailing vessel—That ship is a bark.

In an exemplary embodiment, intermediate results of the exemplary relationship analysis process, based on the exemplary sentences, and the above exemplary possible meanings, can be given in Tables 1-4, as follows.

TABLE 1

The top five word and/or phrase pairings for "The hot dog is read to eat," based on numerical comparisons.

| Total | Word | Meaning | Word | Meaning |
| --- | --- | --- | --- | --- |
| 3686 | hot dog | food | eat | nourishment |
| 3596 | hot dog | food | ready | make preparations |
| 3044 | hot dog | food | ready to | inclining |
| 2976 | hot dog | food | eat | ingesting |
| 2189 | hot | sex | dog | male |

TABLE 2

The results of Table 1 completed with best comparisons of rest of words in the sentence (overall totals in parentheses).

| Total | Word | Meaning | Word | Meaning |
| --- | --- | --- | --- | --- |
| 3686 | hot dog | food | eat | nourishment |
| (7282) | the | specific | is | existing |
|  | to | toward | ready | make preparations |
| 3596 | hot dog | food | ready | make preparations |
| (7282) | the | specific | is | existing |
|  | to | toward | eat | nourishment |
| 3044 | hot dog | food | ready to | inclining |
| (6730) | the | specific | is | existing |
|  | eat | nourishment |  |  |
| 2976 | hot dog | food | eat | ingesting |
| (6572) | the | specific | is | existing |
|  | to | toward | ready | make preparations |
| 2189 | hot | sex | dog | male |
| (3840) | the | specific | is | existing |
|  | ready to | inclining | eat | nourishment |

TABLE 3

The top five word and/or phrase pairings for "The hot dog is read to bark", based on numerical comparisons.

| Total | Word | Meaning | Word | Meaning |
| --- | --- | --- | --- | --- |
| 3596 | hot dog | food | ready | make preparations |
| 3044 | hot dog | food | ready to | inclining |
| 2356 | dog | canine | bark | animal sound |
| 2189 | hot | sex | dog | male |
| 1995 | hot | Heated | dog | canine |

TABLE 4

The top results of Table 3 completed with the best comparisons of the rest of the words in the sentence (overall totals in parentheses).

| Total | Word | Meaning | Word | Meaning |
| --- | --- | --- | --- | --- |
| 3596 | hot dog | food | ready | make preparations |
| (5434) | the | specific | is | existing |
|  | to | toward | bark | outer covering |
| 3044 | hot dog | food | ready to | inclining |
| (4882) | the | specific | is | existing |
|  | bark | outer covering |  |  |
| 2356 | dog | canine | bark | animal sound |
| (5801) | the | specific | is | existing |
|  | hot | heated | ready to | inclining |
| 2189 | hot | sex | dog | male |
| (2933) | the | specific | is | existing |
|  | ready to | inclining | bark | harsh sound |
| 1995 | hot | heated | dog | canine |
| (4774) | the | specific | is | existing |
|  | ready to | inclining | bark | animal sound |

Figure 2A:
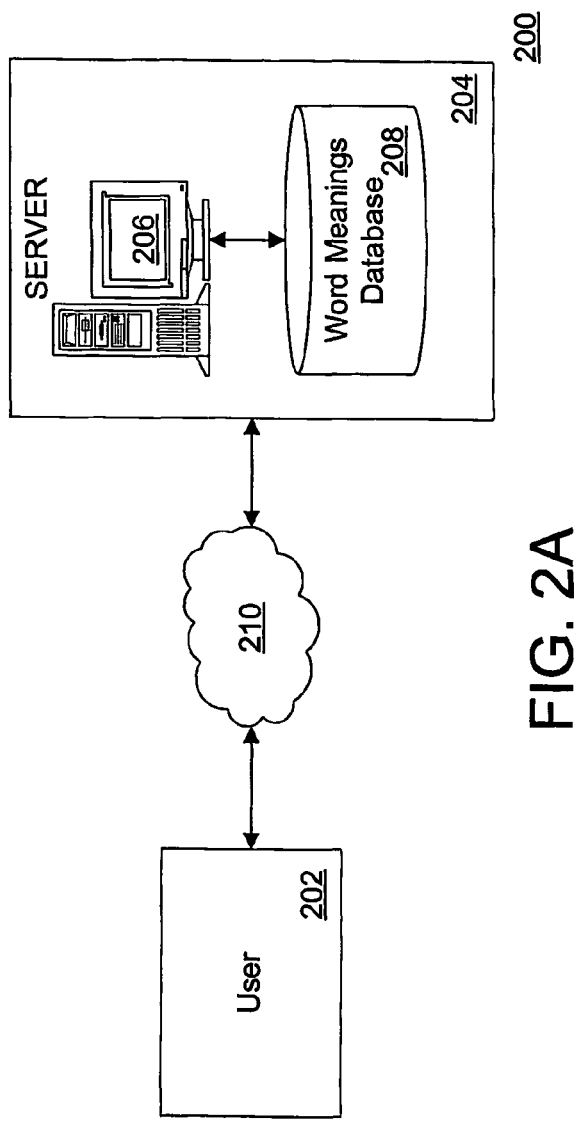
FIG. 2A illustrates an exemplary system that can be configured to perform the exemplary relationship analysis process of FIG. 1.

In an exemplary embodiment, the final results generated by the exemplary relationship analysis process for the exemplary sentences, based on the results of Tables 1-4, can be given by:
The—Specific object
hot dog—Food
is—Existing
ready—Make preparations
to—Toward
eat—Nourishment
The—Specific object
hot—Heated
dog—Canine
is—Existing
ready to—Inclined
bark—Animal sound FIG. 2A illustrates an exemplary system 200 that can be configured to perform the exemplary relationship analysis process of FIG. 1. In FIG. 2A, the exemplary system 200, for example, can include one or more user devices 202 coupled over a communications network 210 to a computer system, such as server 204, and the like. The server 204 can include a computer 206 and a database 208, for example, for storing the meanings for words and/or phrases, and the like, employed by the exemplary relationship analysis process.

Figure 2B:
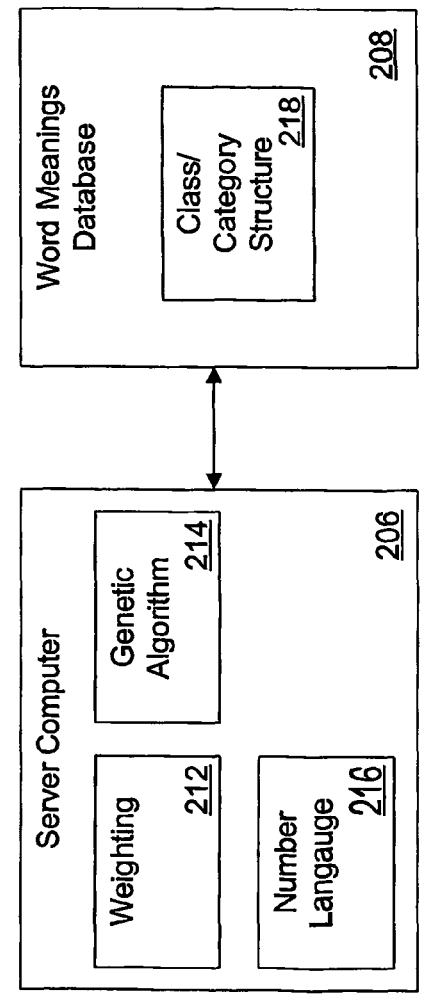
FIG. 2B illustrates an exemplary computer and word meanings database of the exemplary system of FIG. 2A.

FIG. 2B illustrates the exemplary computer 206 and the word meanings database 208 of the exemplary system 200 of FIG. 2A. In FIG. 2B, the computer 206 can include a weighting component 212, a genetic algorithm component 214, a number language component 216, and the like, for performing the exemplary relationship analysis process, coupled to the database 208, for example, for storing the meanings for words and/or phrases based on the exemplary class/category structure 218, and the like, employed by the exemplary relationship analysis process. The components 212-218, for example, can be implemented as one or more software and/or hardware components, functions, modules, sub-systems, and the like.

Thus, the exemplary relationship analysis process, advantageously, can be used in understanding syntactically-identical sentences, for example, having an idiom that changes meaning depending on context. In a further exemplary embodiment, the exemplary relationship analysis process can be employed for multilingual natural language understanding (NLU), wherein high-quality NLU, machine translation (MI), text analysis, semantic tagging, and the like, can be made possible, advantageously, without a need to employ statistics. The exemplary relationship analysis process can be employed to provide a novel system and method that can employ the innate relationships of words in a sensible message to determine a true contextual meaning of the words, advantageously, without using statistics. The exemplary relationship analysis process, thus, includes the class/category structure 218 of language concepts, the weighted inheritance sub-system 212, the number language word conversion 216, and the genetic algorithm 214 tailored to select the best of the possible word meanings from the database 208.

The exemplary relationship analysis process, thus, can be a powerful, language independent method, which can be employed for machine translation with languages, such English, French, Arabic, and the like, as source languages, and with English, French, German, Hindi, Russian, and the like, as target languages. In an exemplary embodiment, relationship analysis also can be employed for sophisticated text analyses, wherein text can be recognized irrespective of the text language. In an exemplary embodiment, such analyses can employed, for example, using English and Arabic texts, with applications that include concept searches, e-mail routing, language-independent programmed instruction, and the like. In addition, the class/category data analysis of the exemplary relationship analysis process, advantageously, provides machine-readable codes suitable for semantic metadata indexing, semantic tags, and the like.

The exemplary embodiments, advantageously, can be configured as a computer-implemented system and method for extracting natural language intelligence through the exemplary relationship analysis process, for example, as described with respect to FIGS. 1-2. In an exemplary embodiment, the exemplary relationship analysis process can be based on the premise that the meaning of each word and/or phrase in a message can be determined from the possible meanings of the other words and/or phrases in the message. The relationships between the various possible meanings can be clarified by using the multilevel class/category structure 218 of language concepts, for example, including 16 classes, such as Living Things, Human Society, Behavior & Ethics, and the like, and 864 categories, such as Sleeping, Eating, Medicine, and the like.

In an exemplary embodiment, a language in each of the major language families (e.g., including the first language of over 70% of the world's people) can be inspected for consistency with such classes/categories 218. Such language families can include the Chinese family, the Germanic family, the Indic family, the Japanese family, the Malayo-Polynesian family, the Romance family, the Semitic family, the Slavic family, and the like. In an exemplary embodiment, the exemplary class/category structure 218 of language concepts can be configured such that the covered languages include every category and such that every word and/or phrase of such languages can fit into a category of the class/category structure 218.

In an exemplary embodiment, analysis of the class/category relationships based on the class/category structure 218 can include employing the weighted inheritance sub-system 212 for the words and/or phrases, the number language 216, the tailored genetic algorithm 214, and the like. The exemplary relationship analysis process can include semantic analysis, as well as language-specific syntax information, such as dependent/independent phrase parsing, part-of-speech clarification, possessive information, and the like, advantageously, producing accurate results, with the syntax guidance distinctly improving system performance.

Advantageously, the exemplary relationship analysis process can be language independent, wherein messages in a variety of natural languages can be analyzed using common software. In an exemplary embodiment, the exemplary relationship analysis process can be employed, for example, with English, French, and Arabic as source languages and English, French, German, Hindi, and Russian as target languages. In further exemplary embodiments, however, the exemplary relationship analysis process can be employed with other source and target languages, as will be appreciated by those skilled in the relevant art(s).

In an exemplary embodiment, the weighted inheritance sub-system 212 can include initially assigning a weight to word and/or phrase meanings of a message, for example, based on the common dictionary interpretation of the word and/or phrase. For example, "hot" meaning "extremely warm" can be assigned a higher initial weight than "hot" meaning "radioactive." However, such weights can be further adjusted depending on relationships of the word and/or phrase being analyzed with other words and/or phrases in the message. In a further exemplary embodiment, the exemplary language processing can employ additional analysis, for example, to link category relationships beyond those found in the exemplary class/category relationships hierarchy 218.

In an exemplary embodiment, the number language component 216 can be employed because words can be difficult for computers to evaluate. For example, each word and/or phrase entered in the exemplary system 200 can be transformed into a number that represents a relative place thereof in the exemplary class/category organization 218. By forming pairs of the words and/or phrases of the message and comparing the values of the relative places thereof (e.g., adjusted by the weights based on the weighting component 212), a value for the pair relationship can be obtained. In an exemplary embodiment, such valuations can be calculated for all pairs and all meanings of words and/or phrases in the message.

In an exemplary embodiment, the genetic algorithm 214 can be employed because the possible meanings for words and/or phrases within a message can quickly produce a massive number of possible message interpretations. For example, even a seven-word sentence can easily result in over 100,000 possible sentence interpretations. While only a few of such sentences will be sensible, a computer has no way of knowing which meanings are sensible and which meanings are not sensible, and the combinatorial explosion of such analysis can quickly overrun the processing capabilities of most computers.

The present invention includes recognition that the combinatorial explosion problem can be one of the major reasons for failure in early NLU attempts. Recently, a mathematical technique called genetic algorithms was developed to address such hard problems, and has been applied to weather forecasting, pipeline analysis, traveling salesman problems, etc. Conceptually similar to the way body cells produce DNA, in a genetic algorithm, the most viable products survive to combine with other viable products to produce the fittest final product. In the exemplary relationship analysis process, the exemplary genetic algorithm 214 can be configured to compare partial message solutions with each other, with the best solutions being retained while the other solutions being discarded. Through multiple combinations and adjustments, based on the exemplary genetic algorithm 214, the best message can be developed. Thus, advantageously, the exemplary embodiments can employ any suitable genetic algorithm system, sub-system, method, and the like, for performing natural language analysis.

In an exemplary embodiment, the exemplary relationship analysis process can be configured to be domain independent and language independent. Advantageously, a common semantic interpreter can be employed to interpret messages irrespective of the domain under consideration or the source language. Although the correctness of interpretation results can be shown by the computer codes produced by the exemplary semantic interpreter, a more compelling demonstration includes machine translations of such codes. For example, the following exemplary semantic problems in sentence understanding, typically, cannot be analyzed by employing purely syntactic processes.

In an exemplary embodiment, in the following groups of sentences having English as the source language and French and German as target languages, the exemplary relationship analysis process, advantageously, can be employed to disambiguate syntactically identical sentences with a homonym in English.
 My refrigerator is running and my nose is running.
 Mon réfrigérateur fonctionne et mon nez coule.
 Mein Kühlchrank läuft und meine Nase rinnt.
 My candidate is running.
 Mon candidat se présente aux élections.
 Mein Kandidat stellt sich der Wahl.

In the following group of sentences, the exemplary relationship analysis process, advantageously, can employ sentence information to determine the best overall meaning (e.g., compare the below group with the previous group of sentences, "My candidate is running").
 My candidate is running a temperature.
 Mon candidat fait une fièvre.
 Mein Kandidat hat ein Fieber.

In the following groups of sentences, the exemplary relationship analysis process, advantageously, can be sensitive to changes in sentence meaning, for example, caused by changing a single word.
 The hot dog is ready to eat.
 Le hot-dog est prêt à manger.
 Die Franker Wurst is fertig zu essen.
 The hot dog is ready to bark.
 Le chien chaud est prêt à aboyer.
 Der heisse Hund ist fertig zu bellen.

In an exemplary embodiment, for example, with French as the source language and English and German as target languages, in the following groups of sentences, the exemplary relationship analysis process, advantageously, can be employed to disambiguate syntactically identical sentences with a homonym in French.
 C'est la crème pour le café.
 That is the cream for the coffee.
 Das ist die Sahne für den Kaffee.
 C'est la table pour le café.
 That is the table for the café.
 Das ist der Tisch für das Café.
 C'est la crème de la promotion.
 That is the top of the class.
 Das ist die Spitze von die Klasse.

In an exemplary embodiment, for example, with Arabic as the source language and English, French and German as target languages, in the following groups of sentences, the exemplary relationship analysis process, advantageously, can be employed to disambiguate syntactically identical sentences with a homonym in Arabic.
 تناول الأستاذ الموضوع في الدرس
 The professor dealt with the subject during the lesson.
 Le professeur a traité le sujet pendant la leçon.
 Der Professor hat der Gegenstand während des Unterricht behandelt
 تناول الأستاذ الطعام في الدرس
 The professor ate the food during the lesson.
 Le professeur mange la nourriture pendant la leçon.
 Der Professor aß die Speise während des Unterricht In an exemplary embodiment, the exemplary relationship analysis process can be employed on the following groups of sentences, advantageously, to recognize animal sounds from human sounds (e.g., note that the first Arabic word is identical in both groups, but changes meaning depending if the sound is animal or human).
 يصيح الديك
 The rooster crows.
 Le coq chante.
 Der Hahn kräht.
 يصيح الأستاذ على تلاميذه
 The professor yells at his students.
 Le professor hurle à ses étudiants.
 Der Professor schimpft bei seine Studenten.

In an exemplary embodiment, the exemplary relationship analysis process can employ sentence information of the following groups of sentences to determine the best overall meaning in Arabic, as accurately as can be determined using English as the source language. The sentences that form the groups are identical except that an additional word has been added to the second group of sentences changing the meaning thereof. The exemplary relationship analysis process can be employed for identification of places or people in a target language, advantageously, permitting the proper words to be selected, for example, in the French translation, German translation, and the like.
 أريد أن أزور جدة
 I want to visit Jeddah.
 Je veux visiter Jeddah.
 Ich will nach Jeddah reisen.
 أريد أن أزور جدة زوجتي
 I want to visit my wife's grandmother.
 Je veux rendre visite à la grandmere de ma femme.
 Ich will die Grossmutter meiner Frau besuchen.

In an exemplary embodiment, the exemplary relationship analysis process can be employed in semantic disambiguation of sentences with syntactic differences, for example, as given by:
 That is a husky male and a male husky.
 C'est un mâle costaud et un chien esquimeau mâle.
 Das is ein robuster Mann und ein männlicher Eskimohund.

In an exemplary embodiment, while machine translation (MT) typically entails detailed relationship analysis to select the proper meaning of each word and/or phrase, a more general text analysis to determine overall concepts can be performed using a simplified form of the exemplary relationship analysis process. Advantageously, such concept determination, for example, can be used for message routing, as a sophisticated search tool to find text referring to topics of interest for further consideration by a human analyst, and the like.

Figure 3:
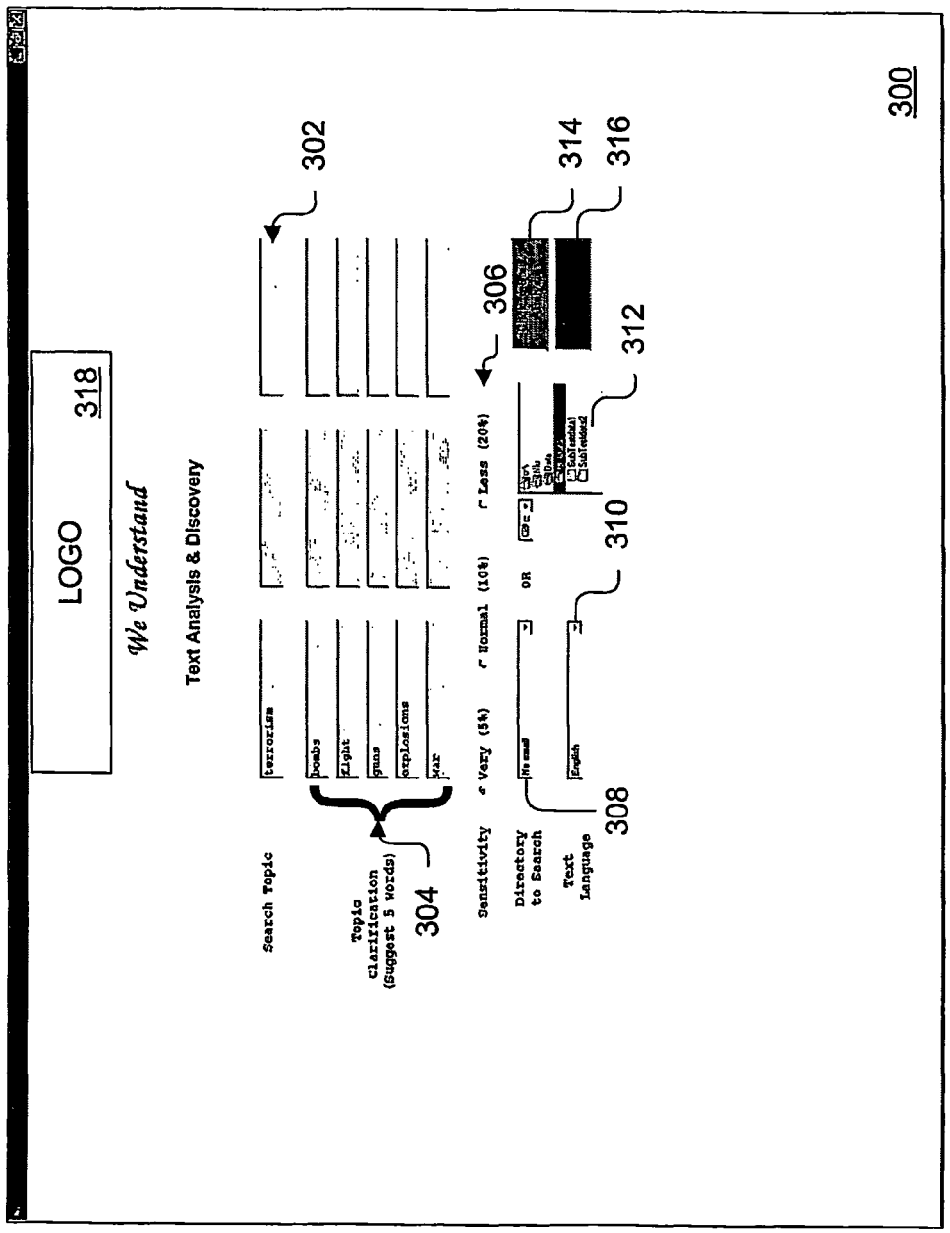
FIG. 3 illustrates an exemplary Text Analysis & Discovery window of a graphical user interface of the exemplary system of FIGS. 2A-2B.

FIG. 3 illustrates an exemplary Text Analysis & Discovery window 300 of a graphical user interface of the exemplary system 200 of FIGS. 2A-2B. In FIG. 3, the exemplary Text Analysis & Discovery (TAD) window 300 can be employed for performing multi-language text analysis, and the like, and, for example, can include Search Topic fields 302, Topic Clarification fields 304, a Directory to Search dropdown menu 308, a Text Language dropdown menu 310, a directory navigation window portion 312, a Click to Start Analysis button 314, a Criteria Matched Click to View report button 316, and a logo portion 318.

The exemplary TAD window 300 can be configured to request a user to choose one or more search topics, via the Search Topic fields 302, and then identify, for example, five words that remind the user of the topic to be searched, for example, entered in the fields 304. Such a clarification in the fields 304 can be employed to help the exemplary system understand the concepts for which the exemplary system is to search For example, if "banks" is entered as the topic in the Search Topic field 302, the system may need to know if financial institutions or aircraft movements or river structures, etc., is the topic of interest. In the exemplary window 300, "terrorism" is the topic to be searched, with "bombs," "fight," "guns," "explosions," and "war," employed as clarifying words. In an exemplary embodiment, a test directory including text files with a variety of topics in both English and Arabic, with one paragraph referring to terrorism-type subjects can be employed to validate the exemplary system. Advantageously, the exemplary system allows for various levels of sensitivity to be chosen, as illustrated by the following exemplary scenarios.

Scenario 1—Tricky terrorists. Let's say the Men in Black have seized computers from possible terrorists. These computers contain hundreds of files, each hundreds of pages long, with identifiers such as "antiques," "sports," "recipes," etc. However, the terrorists know to go to page 127 of a particular file to find a single paragraph detailing their plans. If the police had to manually read all those files, the specific paragraph may be missed or may not be discovered until after the terrorist activity has happened. The exemplary relationship analysis, via the exemplary TAD window 300, can come to the rescue!

In doing the TAD scan, according to the exemplary embodiments, advantageously, the following paragraph can be discovered:

"There has been one violation—the killing Monday of a 45-year-old worker from Bulgaria, who was shot in the head by a sniper outside the West Bank city of Jenin, about 45 miles north of Jerusalem. A renegade branch of al-Aqsa Martyrs Brigades, the militant wing of Arafat's and Abbas's mainstream Fatah movement, asserted responsibility for the killing, saying it opposed the cease-fire."

In an exemplary embodiment, such a paragraph need not include any of the topic or clarification words (e.g., terrorism, bombs, fight, guns, explosions, war) to be discovered, as the exemplary TAD system uses such words to identify the concepts to search for and find information that matches such concepts.

Scenario 2—Trickier terrorists. But what if the hundreds of files, each containing hundreds of pages, are in Arabic? Since the exemplary relationship analysis typically is concerned with concepts, advantageously, the text language need not matter. For example, by selecting Arabic as the text language, via the dropdown menu 310, the same scan can be done, which using test files, can yield the following paragraph, which is the equivalent of the previously discovered paragraph, but this time in Arabic:

الدمار الشامل دون تعاون بلير ينتقد الخطة الفرنسية الألمانية بنزع سلاح العراق ويقول إنه من العبث
البرلمان التركي يبحث نشر آلاف الجنود الأميركان. الاعتقاد بأن مفتشي الأسلحة قد يعثرون على أسلحة
بوش يصر أن إصدار مجلس الأمن لقرار جديد يجيز العمل العسكري ليس أمرا كاملا من بغداد.
ضروريا لواشنطن.

Thus, advantageously, the topic and clarification words can be in a first source language, such as English, even if the text being searched is in a different language, such as Arabic.

In an exemplary embodiment, the exemplary text analysis application of the exemplary relationship analysis process also can have a direct use, for example, for e-mail routing, and the like. For example, large and small companies or even individuals can receive hundreds or even thousands of e-mails every day asking for product information, to register a compliment or a complaint, to ask for service, and the like. Currently, such e-mails are manually routed to the appropriate customer service area. However, such e-mails, advantageously, can be interpreted using the exemplary relationship analysis process and then automatically routed, advantageously, providing faster and less expensive customer service, and the like.

In an exemplary embodiment the exemplary relationship analysis process can be employed to address problems with web-based programmed instruction, such as interpreting the responses of students, and the like. Attempts to require a student to select menu options or restrict the language of the student in some way, typically, has only caused the student to reject the instruction altogether.

Once again, the exemplary relationship analysis process comes to the rescue. Because the exemplary relationship analysis process permits contextual natural language understanding, students can enter responses, in free form, and which can be analyzed and coded for programmed instruction interpretation. In an exemplary embodiment, because the response of the student can include misspellings, a soundex-type conversion, and the like, can be employed.

In an exemplary embodiment, the exemplary relationship analysis process can be employed, for example, to set machine-readable semantic tags in text, which later can be referenced by analysis software, and the like. The exemplary NLU class/category data structure 218 can be configured to define numeric codes that uniquely identify semantic concepts to an arbitrarily low level. For example, a file generated by the exemplary relationship analysis process for machine translation purposes, can be given by:

sentences(1,3,[1],"the"," ",126,1,50,"adj",'N')
sentences(1,3,[2],"hot"," ",238,1,78,"adj",'N')
sentences(1,3,[3],"dog"," ",333,2,214,"subject",'N')
sentences(1,3,[4],"is"," ",730,1,107,"verb",'N')
sentences(1,3,[5,6],"ready_to"," ",138,1,19,"prep",'N')
sentences(1,3,[7],"bark"," ",784,2,1,"verb",'N')
sentences(1,3,[8],"."," ",0,1,0," ",'N')

The numbers (e.g., shown in bold above) permit the exemplary machine translation software to select the specific target language word and/or phrase to correspond with the source language concept. However, such numbers, for example, also can be configured as hidden fields with the text or used in an index file to function as semantic tags for sophisticated search and analysis software, and the like. The exemplary numeric tags can be language independent, wherein the same numbers can be used irrespective of the source language, advantageously, permitting analyses across natural language boundaries. The above-described devices and subsystems of the exemplary embodiments of FIGS. 1-3 can include, for example, any suitable servers, workstations, Personal Computers (PCs), laptop computers, Personal Digital Assistants (PDAs), Internet appliances, handheld devices, cellular telephones, wireless devices, other devices, etc., capable of performing the processes of the exemplary embodiments. The devices and subsystems can communicate with each other using any suitable protocol and can be implemented, for example, using the computer system 400 of FIG. 4. The devices and subsystems of the exemplary embodiments of FIGS. 1-3 can communicate with each other over a communications network, such as the communications network 210, such as the Internet, an intranet, a local area network (LAN), and the like.

One or more interface mechanisms can be used in the exemplary embodiments of FIGS. 1-3 including, for example, Internet access, telecommunications in any suitable form, for example, voice, modem, wireless communications media, and the like. Accordingly, the communications network 210 employed in the exemplary embodiments of FIGS. 1-3 can include, for example, one or more wired or wireless communications networks, cellular communications networks, G3 communications networks, Public Switched Telephone Network (PSTNs), Packet Data Networks (PDNs), the Internet, intranets, and/or combination thereof, and the like.

It is to be understood that the exemplary embodiments of FIGS. 1-3 are for exemplary purposes, as many variations of the specific hardware and software used to implement the described embodiments are possible, as can be appreciated by those skilled in the relevant art(s). For example, the functionality of the devices and the subsystems of the exemplary embodiments of FIGS. 1-3 can be implemented via one or more programmed computer systems or devices.

To implement such variations as well as other variations, a single computer system (e.g., the computer system 400 of FIG. 4) can be programmed to perform the special purpose functions of one or more of the devices and subsystems of the exemplary embodiments of FIGS. 1-3. On the other hand, two or more programmed computer systems or devices can be substituted for any one of the devices and subsystems of the exemplary embodiments of FIGS. 1-3. Accordingly, principles and advantages of distributed processing, such as redundancy, replication, etc., also can be implemented, as desired, for example, to increase the robustness and performance of the exemplary embodiments of FIGS. 1-3.

The exemplary embodiments of FIGS. 1-3 can store information relating to various exemplary processes described herein. This information can be stored in one or more memories, such as a hard disk, optical disk, magneto-optical disk, RAM, and the like, of the devices of the exemplary embodiments of FIGS. 1-3. One or more databases of the devices and subsystems of the exemplary embodiments of FIGS. 1-3, such as the spectra database 208, and the like, can store the information used to implement the exemplary embodiments of the present invention. The databases can be organized using data structures (e.g., records, tables, arrays, fields, graphs, trees, and/or lists) included in one or more memories, such as the memories listed above or any suitable storage devices, such as the storage devices listed below in the discussion of FIG. 4, and the like.

The exemplary embodiments of FIGS. 1-3 can include appropriate data structures for storing data collected and/or generated in one or more databases thereof, such as the spectra database 208, and the like. Such data structures, accordingly, can include fields for storing such collected and/or generated data In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the exemplary embodiments of the present invention are not limited to any particular type of data container or database architecture.

All or a portion of the exemplary embodiments of FIGS. 1-3 can be conveniently implemented using one or more conventional general purpose computer systems, microprocessors, digital signal processors, micro-controllers, and the like, programmed according to the teachings of the embodiments of the present invention (e.g., using the computer system of FIG. 4), as can be appreciated by those skilled in the computer and software art(s). Appropriate software can be readily prepared by programmers of ordinary skill based on the teachings of the present disclosure, as can be appreciated by those skilled in the software art. Further, the exemplary embodiments of FIGS. 1-3 can be implemented on the World Wide Web (e.g., using the computer system of FIG. 4). In addition, the exemplary embodiments of FIGS. 1-3 can be implemented by the preparation of application-specific integrated circuits or by interconnecting an appropriate network of conventional component circuits, as can be appreciated by those skilled in the electrical art(s).

Figure 4:
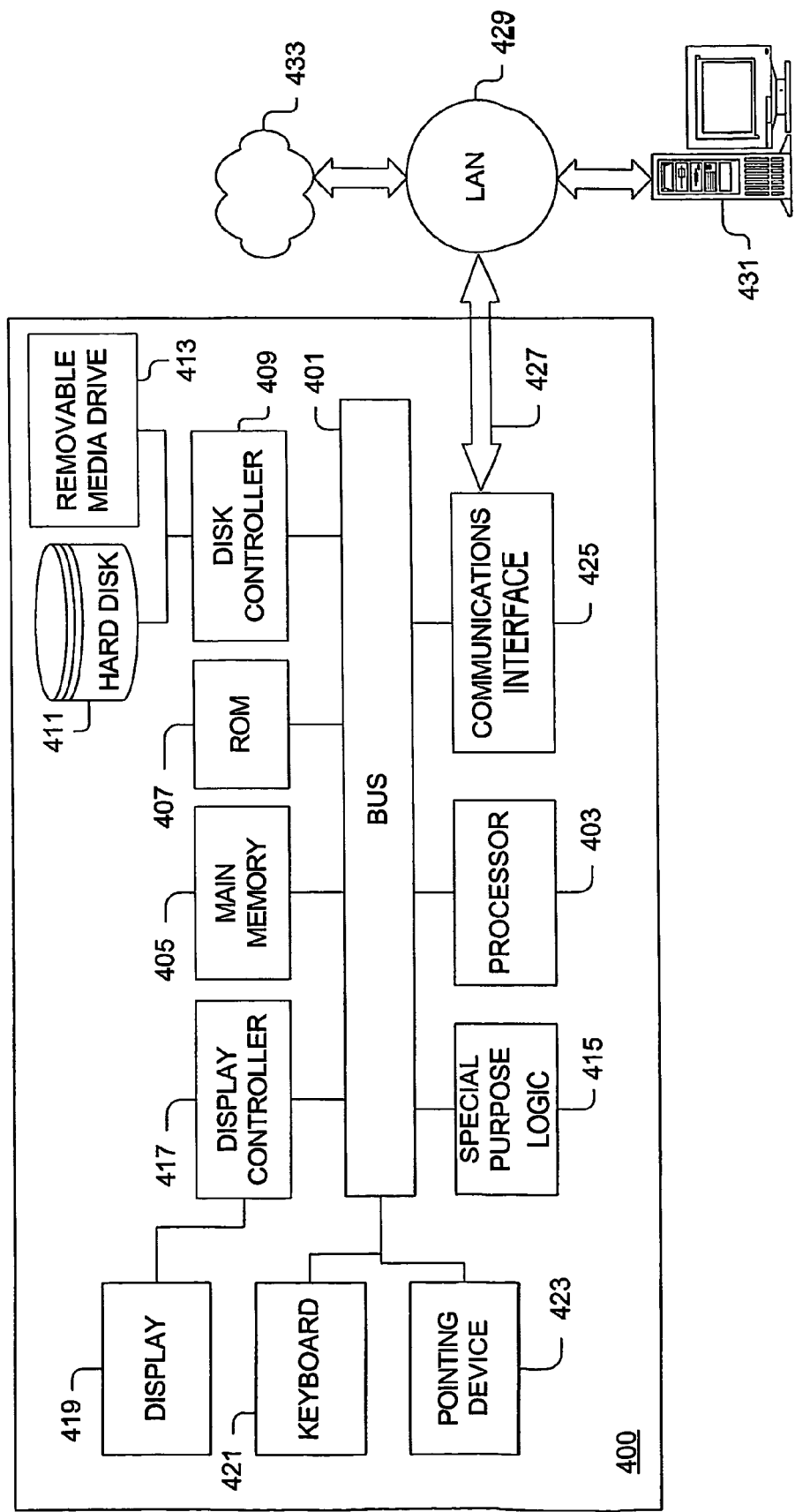
FIG. 4 illustrates an exemplary computer system, which can be programmed to perform one or more of the processes of the described exemplary embodiments.

FIG. 4 illustrates a computer system 400 upon which the exemplary embodiments (e.g., the devices and subsystems of the exemplary embodiments of FIGS. 1-3) can be implemented. The various embodiments can be implemented on a single such computer system, or a collection of multiple such computer systems. The computer system 400 can include a bus 401 or other communication mechanism for communicating information, and a processor 403 coupled to the bus 401 for processing the information. The computer system 400 also can include a main memory 405, such as a random access memory (RAM), other dynamic storage device (e.g., dynamic RAM (DRAM), static RAM (SRAM), synchronous DRAM (SDRAM)), etc., coupled to the bus 401 for storing information and instructions to be executed by the processor 403.

In addition, the main memory 405 also can be used for storing temporary variables or other intermediate information during the execution of instructions by the processor 403. The computer system 400 further can include a ROM 407 or other static storage device (e.g., programmable ROM (PROM), erasable PROM (EPROM), electrically erasable PROM (EEPROM), etc.) coupled to the bus 401 for storing static information and instructions.

The computer system 400 also can include a disk controller 409 coupled to the bus 401 to control one or more storage devices for storing information and instructions, such as a magnetic hard disk 411, and a removable media drive 413 (e.g., floppy disk drive, read-only compact disc drive, read/write compact disc drive, compact disc jukebox, tape drive, removable magneto-optical drive, flash drive, such as thumb drive, pen drive, etc.). The storage devices can be added to the computer system 400 using an appropriate device interface (e.g., small computer system interface (SCSI), integrated device electronics (IDE), enhanced-IDE (E-IDE), direct memory access (DMA), or ultra-DMA).

The computer system 400 also can include special purpose logic devices 415, such as application specific integrated circuits (ASICs), fill custom chips, configurable logic devices, e.g., simple programmable logic devices (SPLDs), complex programmable logic devices (CPLDs), field programmable gate arrays (FPGAs), and the like, for performing special processing functions, such as signal processing, image processing, speech processing, optical character recognition (OCR), voice recognition, text-to-speech and speech-to-text processing, communications functions, genetic algorithm functions, weighting functions, number language functions, class/category structure functions, and the like.

The computer system 400 also can include a display controller 417 coupled to the bus 401 to control a display 419, such as a cathode ray tube (CRI), liquid crystal display (LCD), television display, active matrix display, plasma display, touch display, and the like, for displaying or conveying information to a computer user. The computer system can include input devices, such as a keyboard 421 including alphanumeric and other keys and a pointing device 423, for interacting with a computer user and providing information to the processor 403. The pointing device 423 can include, for example, a mouse, a trackball, a pointing stick, etc. or voice recognition processor, etc., for communicating direction information and command selections to the processor 403 and for controlling cursor movement on the display 419. In addition, a printer can provide printed listings of the data structures/information of the exemplary embodiments of FIGS. 1-3 or any other data stored and/or generated by the computer system 400.

The computer system 400 can perform all or a portion of the processing steps of the invention in response to the processor 403 executing one or more sequences of one or more instructions contained in a memory, such as the main memory 405. Such instructions can be read into the main memory 405 from another computer readable medium, such as the hard disk 411 or the removable media drive 413. Execution of the arrangement of instructions contained in the main memory 405 causes the processor 403 to perform the process steps described herein. One or more processors in a multi-processing arrangement also can be employed to execute the sequences of instructions contained in the main memory 405. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 400, for driving a device or devices for implementing the invention, and for enabling the computer system 400 to interact with a human user (e.g., users of the exemplary embodiments of FIGS. 1-3, etc.). Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 400 also can include a communication interface 425 coupled to the bus 401. The communication interface 425 can provide a two-way data communication coupling to a network link 427 that is connected to, for example, a LAN 429, or to another communications network 433 (e.g., a wide area network (WAN), a global packet data communication network, such as the Internet, etc.). For example, the communication interface 425 can include a digital subscriber line (DSL) card or modem, an integrated services digital network (ISDN) card, a cable modem, a telephone modem, etc., to provide a data communication connection to a corresponding type of telephone line. As another example, the communication interface 425 can include a local area network (LAN) card (e.g., for Ethernet™, an Asynchronous Transfer Model (ATM) network, etc.), etc., to provide a data communication connection to a compatible LAN. Wireless links also can be implemented. In any such implementation, the communication interface 425 can send and receive electrical, electromagnetic, or optical signals that carry digital data streams representing various types of information. Further, the communication interface 425 can include peripheral interface devices, such as a Universal Serial Bus (USB) interface, a PCMCIA (Personal Computer Memory Card International Association) interface, etc.

The network link 427 typically can provide data communication through one or more networks to other data devices. For example, the network link 427 can provide a connection through the LAN 429 to a host computer 431, which has connectivity to the network 433 or to data equipment operated by a service provider. The LAN 429 and the network 433 both can employ electrical, electromagnetic, or optical signals to convey information and instructions. The signals through the various networks and the signals on the network link 427 and through the communication interface 425, which communicate digital data with computer system 400, are exemplary forms of carrier waves bearing the information and instructions.

The computer system 400 can send messages and receive data, including program code, through the network 429 and/or 433, the network link 427, and the communication interface 425. In the Internet example, a server can transmit requested code belonging to an application program for implementing an embodiment of the present invention through the network 433, the LAN 429 and the communication interface 425. The processor 403 can execute the transmitted code while being received and/or store the code in the storage devices 411 and 413, or other non-volatile storage for later execution. In this manner, computer system 400 can obtain application code in the form of a carrier wave. With the system of FIG. 4, the embodiments of the present invention can be implemented on the Internet as a Web Server 400 performing one or more of the processes according to the embodiments of the present invention for one or more computers coupled to the Web server 400 through the network 433 coupled to the network link 427.

The term computer readable medium as used herein can refer to any medium that participates in providing instructions to the processor 403 for execution. Such a medium can take many forms, including but not limited to, non-volatile media, volatile media, transmission media, etc. Non-volatile media can include, for example, flash drives, optical or magnetic disks, magneto-optical disks, etc., such as the hard disk 411 or the removable media drive 413. Volatile media can include dynamic memory, etc., such as the main memory 405. Transmission media can include coaxial cables, copper wire and fiber optics, including the wires that make up the bus 401. Transmission media also can take the form of acoustic, optical, or electromagnetic waves, such as those generated during radio frequency (RF) and infrared (IR) data communications.

As stated above, the computer system 400 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, flash drive, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 429 and 433. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

The exemplary relationship analysis process, thus, provides a powerful semantics-oriented analysis technique that can produce contextually correct interpretations of words and/or phrases, and linguistically accurate machine translations of such words and/or phrases, in a variety of natural languages. Advantageously, the exemplary relationship analysis process can be employed to recognize nuances in messages and which typically is not possible with purely syntactic approaches. Further, the exemplary relationship analysis process has potential applications in natural language understanding, contextual natural language understanding, machine translation, text analysis, text coding (e.g., such as with the Semantic Web), e-mail routing, programmed instruction, semantic tags, and the like.

Although the exemplary relationship analysis process is described in terms of being employed with English, French, and Arabic as source languages and English, French, German, Hindi, and Russian as target languages, other source and target languages can be employed, as will be appreciated by those skilled in the relevant art(s).

Although the exemplary relationship analysis process is described in terms of being employed in applications including natural language understanding, contextual natural language understanding, machine translation, text analysis, text coding (e.g., such as with the Semantic Web), e-mail routing, programmed instruction, semantic metadata indexing, semantic tags, and the like, the exemplary relationship analysis process can be employed in other applications for processing language and/or text, as will be appreciated by those skilled in the relevant art(s).

While the present invention has been described in connection with a number of exemplary embodiments and implementations, the present invention is not so limited but rather covers various modifications and equivalent arrangements, which fall within the purview of the appended claims.

LIST OF REFERENCES

[1]. Albani, E., Ceccato, S., & Maretti, E. (1961). Classifications, rules, and code of an operational grammar for mechanical translation. In A. Kent (Ed.) Information retrieval and machine translation (pp. 693-753). 2 vols. New York: Interscience.

[2]. Andreev, N. (1967). The intermediary language as the focal point of machine translation. In A. D. Booth (Ed.), Machine translation (pp. 1-29). Amsterdam: North-Holland.

[3]. Arthem, P. J. (1978). Machine translation and computerized terminology systems: A translator's viewpoint. In B. M. Snell (Ed.), Translating and the computer. Amsterdam: North-Holland.

[4]. Carbonell, J. G., Cullingford, R. E., & Gershman, A. V. (1981). Steps toward knowledge-based machine translation. IEEE Transactions on Pattern Analysis and Machine Intelligence 3(4), 376-392.

[5]. Carlson, B. (1992, March). English-only orientation limits opportunities in today's high-tech world. IEEE Computer, 81-82.

[6]. Ceccato, S. (1966). Automatic translation of languages. In NATO, Automatic translation of languages (pp. 55-108). Oxford: Pergamon Press.

[7]. Ceccato, S. (1967). Correlational analysis and mechanical translation. In A. D. Booth (Ed.), Machine translation (pp. 77-135). Amsterdam: North-Holland.

[8]. Dostert, L. E. (1955). The Georgetown-IBM experiment. In W. N. Locke & A. D. Booth (Eds.) Machine translation of languages(pp. 124-135). Cambridge, Mass.: MIT Press.

[9]. Evan-Zohar, Y., and Roth, D. 2000. A classification approach to word prediction. In NAACL-2000, The 1st North American Conference on Computational Linguistics, 124-131.

[10]. Foster, G., Langlais, P., & Lapalme, G. (2002) Text prediction with fuzzy alignments. Machine Translation: from Research to Real Users (pp. 44-53). Berlin: Springer.

[11]. Garvin, P. L. (1968). Machine translation today: The fulcrum approach and heuristics. Lingua 21, 162-182.

[12]. Garvin, P. L. (1980). The fulcrum approach—twelve years later. International Forum on Information and Documentation 5(2), 27-29.

[13]. Hauenschild, C., Huckert, E., & Maier, R. (1979). SALAT: Machine translation via semantic representation. In R. Bauerle, et. al. (Eds.), Semantics from different points of view (pp. 324-352). Berlin: Springer.

[14]. Hawes, R. E. (1985). Logos: The intelligent translation system. In V. Lawson (Ed.), Tools for the trade: Translating and the computer 5 (pp. 131-139). London: Aslib.

[15]. Hays, D. G. (1967). Computational linguistics: Research in progress at the Rand Corporation. T.A. Informations, 1967, part 1, 15-20.

[16]. Hutchins, W. J. (1986). Machine translation: Past, present, future. Chichester, England: Ellis Horwood Limited.

[17]. Hutchins, W. J. (1991, April). EUROTRA and other recent developments in machine translation. Talk given at King's College, London.

[18]. Isabelle, P. & Bourbeau, L. (1984). TAUM-AVIATION: Its technical features and some experimental results. Computational Linguistics, v. 11 no. 1, 18-27.

[19]. Ishikawa, H., Izumida, Y., Yoshio, T., Hoshiai, T., & Makinouchi, T. (1987). KID: Designing a knowledge-based natural language interface. IEEE Expert, Summer, 57-71.

[20]. Joshi, A. K (1991). Natural language processing. Science Vol. 253, 1242-1250.

[21]. Kay, M. (1973). Automatic translation of natural languages. Daedalus 102, 217-230.

[22]. Lamb, S. M. (1961). MT research at the University of California, Berkeley. In H. P. Edmundson (Ed.), Proceedings of the National Symposium on Machine Translation, held at the University of California, Los Angeles, Feb. 2-5, 1960(pp. 140-154). London: Prentice-Hall.

[23]. Lamb, S. M. (1965). The nature of the machine translation problem. Journal of Verbal Learning and Verbal Behavior 4, 196-210.

[24]. Langlais, P., Foster, G., Lapalme, G. (2000). Unit completion for a computer-aided translation typing system. Machine Translation 12, 267-294.

[25]. Langlais, P. (2002). Opening statistical translation engines to terminological resources. $7^{th}$ International Workshop on Applications of Natural Language to Information Systems.

[26]. Lehmann, W. P. & Stachowitz, R. A. (1972). Machine translation in Western Europe: A survey. Current Trends in Linguistics, Vol. 9: Linguistics in Western Europe (pp. 688-701). The Hague: Mouton.

[27]. Ljudskanov, A. (1968). Is the generally accepted strategy of machine translation research optimal? Mechanical Translation 11(1/2), 14-21.

[28]. Markham, P. (1989). Effects of contextual versus definitional computer-assisted vocabulary instruction on immediate and long-term vocabulary retention of advanced ESL students. Educational Psychology, Vol. 9, No. 2, 121-126.

[29]. Mersel, J. (1961). Research in machine translation at Ramo-Wooldridge. In H. P. Edmundson (Ed.), Proceedings of the National Symposium on Machine Translation, held at the University of California, Los Angeles, Feb. 2-5, 1960(pp. 26-38). London: Prentice-Hall.

[30]. Montague, R. M. (1974). Formal philosophy, New Haven, Conn.: Yale University Press.

[31]. Needham, R. M. & Joyce, T. (1958). The thesaurus approach to information retrieval. American Documentation 9(3), 192-197.

[32]. Nitta, Y. et al. (1982). A heuristic approach to English-into-Japanese machine translation. In J. Horecky (Ed.), COLING82: Proceedings of the Ninth International Conference on Computational Linguistics, Prague, Jul. 5-10, 1982 (pp. 283-288). Amsterdam: North-Holland.

[33]. Papegaaij, B. C., Sadler, V., & Witkam, A. P. M. (1986). Word expert semantics: An interlingual knowledge-based approach, Dordrecht, The Netherlands: Foris Publications.

[34]. Papp, F. (1966). Mathematical linguistics in the Soviet Union. The Hague: Mouton.

[35]. Pigott, I. M. (1983). Systran: A key to overcoming language barriers in Europe, Multilingua 2(3), 149-156.

[36]. Raman, S. & Alwar, N. (1990). An AI-based approach to machine translation in Indian languages. Communications of the ACM, Vol. 33, No. 5, 521-527.

[37]. Reid, T. R. (2002). The New Europe. National Geographic, January 2002, p. 32-47.

[38]. Rennie, J. (2003). Text classification. Available on the World Wide Web (www) at ai.mit.edu/people/jrennie/talks/9.520-03.pdf.

[39]. Rhodes, I. (1961). The National Bureau of Standards method of syntactic integration. In H. P. Edmundson (Ed.), Proceedings of the National Symposium on Machine Translation, held at the University of California, Los Angeles, Feb. 2-5, 1960 (pp. 3944). London: Prentice-Hall.

[40]. Shank, R. (Ed.) (1975). Conceptual information processing. Amsterdam: North-Holland.

[41]. Small, S. (1983). Parsing as cooperative distributed inference: Understanding through memory interactions. In M. King (Ed.), Parsing natural language (pp. 247-276). London: Academic Press.

[42]. Stone, R. (1991). The education of silicon linguists. Science, vol. 253. 854-855.

[43]. Su, K. Y. & Chang, J. S. (1990). Some key issues in designing MT systems. Machine Translation 5. 265 300.

[44]. Thouin, B. (1982). The METEO system. In V. Lawson (Ed.), Practical experience of machine translation: Proceedings of a conference, London, 5-6 Nov. 1981 (pp. 39-44). Amsterdam: North-Holland.

[45]. Tosh, L. W. (1969). Translation model with semantic capability, Linguistics 55, 56-69.

[46]. Tschira, K. E. (1985). Looking back at a year of German-English MT with Logos. In V. Lawson (Ed.), Tools for the trade: Translating and the computer 5 (pp. 215-235). London: Aslib.

[47]. Vasconcellos, M. (1985). Management of the machine translation environment: Interaction of functions at the Pan American Health Organization. In V. Lawson (Ed.), Tools for the trade: Translating and the computer 5 (pp. 115-129). London: Aslib.

[48]. White, J. S. (1985). Characteristics of the METAL machine translation system at production stage. In S. Nirenburg (Ed.), Proceedings of the Conference on Theoretical and Methodological Issues in Machine Translation of Natural Languages, Colgate University (pp. 359-369). Hamilton, N.Y.: Colgate University.

[49]. Wilks, Y. A. (1972). Grammar, meaning and the machine analysis of language. London: Routledge and Kegan Paul.

[50]. Wilks, Y. A. (1973). An artificial intelligence approach to machine translation. In R. Shank & K. M. Colby (Eds.), Computer models of thought and language (pp. 114-151). San Francisco: Freeman.

[51]. Wilks, Y. A. (1975). Preference semantics. In E. Keenan (Ed.), Formal semantics of natural language (pp. 329-348). Cambridge: Cambridge University Press.

[52]. Witkam, A. P. M. (1984). Distributed language translation, another MT system. Paper presented at the International Seminar on Machine Translation, February 1984, Cranfield, England.

[53]. Wood, M. M. (1991, July). Interactive machine translation for monolinguals. Talk given at King's College, London.

[54]. Zanger, B. R. K. & Stertzbach, L. A. (1991). Hypermedia dictionary for lexically ambiguous sport terms. Proceedings of the Eighth International Conference on Technology and Education, 740-741.

[55]. Zarechnak, M. & Brown, A. F. R. (1961). Current research at Georgetown University. In H. P. Edmundson (Ed.), Proceedings of the National Symposium on Machine Translation, held at the University of California, Los Angeles, Feb. 20, 1960 (pp. 64-87). London: Prentice-Hall.

[56]. Zholkovskii, A. K., Leont'eva, N. N., & Martem'yanov, Y. S. (1961). On the basic use of meaning in machine translation. In J. Ju. Rozentsveig (Ed.) (1974), Machine translation and applied linguistics. 2 vols. (pp. 115-141). Frankfurt A. M.: Athenaion Vlg.

[57]. Howard Bender. Ordered Arrangements of Language Concepts in a Class/Category Structure. Copyright TXu 1-041448.

[58] Howard Bender. Natural Intelligence in a Machine Translation System (2002).

What is claimed is:

1. A computer storage medium comprising computer executable instructions for performing a computer-implemented method for domain-independent natural language understanding, comprising the steps of:
   forming pairs of words and/or phrases in independent phrases in a sentence, wherein each word and/or phrase is paired with every other word and/or phrase;
   determining meanings for the words and/or phrases;
   assigning a numeric code from the pre-existing class and category structure that uniquely identifies semantic concepts to each meaning;
   adjusting the numeric codes using a weighting component;
   storing the adjusted numeric codes that uniquely identify semantic concepts in a computer memory;
   comparing the adjusted numeric codes that uniquely identify semantic concepts of each word and/or phrase with each adjusted numeric code that uniquely identifies the semantic concept of the other word and/or phrase in the pair;
   comparing syntactically identical sentences with a potential idiom that changes adjusted numeric codes that uniquely identify semantic concepts depending on the context using an ontology;
   determining whether a potential idiom is identified and employing appropriate class and category structure to calculate a first adjusted numeric code total, wherein said first adjusted numeric code total corresponds to the best word and/or phrase pairings;
   determining an overall-adjusted numeric code total based on said first adjusted numeric code total by comparing remaining words in a sentence and before selecting the pairs of adjusted numeric codes that uniquely identify semantic concepts with the best relationships based on numerical comparisons;
   selecting the pairs of adjusted numeric codes that uniquely indentify semantic concepts with the best relationships based on numerical comparisons;
   storing the pairs in the computer memory;
   combining highly-related pairs with other highly-related pairs to form longer groups of adjusted numeric codes that uniquely identify semantic concepts;
   exchanging adjusted numeric codes that uniquely identify semantic concepts for the longer groups with adjusted numeric codes that uniquely identify semantic concepts having a weaker relationship to determine if the exchanged adjusted numeric codes that uniquely identify semantic concepts provide an overall stronger relationship based on numerical comparisons;
   forming longer and longer groups until the adjusted numeric codes that uniquely identify semantic concepts are selected in context for all words and phrases in the sentence; and
   relating the adjusted numeric codes that uniquely identify semantic concepts to words and phrases.

2. The method of claim 1, further comprising employing the method for performing language-independent semantic analysis.

3. The method of claim 1, wherein the forming step includes forming legitimate pairs of the words and/or the phrases in the independent phrases in the sentence.

4. The method of claim 1, wherein selecting step includes selecting a same word, with different meanings (expressed as numeric codes that uniquely identify semantic concepts), multiple times, if more than one pair has a strong relationship.

5. The method of claim 1, further comprising analyzing the words and/or phrases of the groups to determine possible meanings based on a numeric class and category structure.

6. The method of claim 1, further comprising employing the method for performing machine translation.

7. The method of claim 1, further comprising employing the method for performing concept determination.

8. The method of claim 7, further comprising employing the concept determination for implementing message routing, and/or a search tool for finding text referring to a topic of interest.

9. The method of claim 1, further comprising employing the method for performing multi-language text analysis.

10. The method of claim 9, further comprising employing a graphical user interface for performing the multi-language text analysis.

11. The method of claim 10, further comprising providing in the graphical user interface a search topic field for entering a search topic, a topic clarification field for entering a word for clarifying the search topic, means for selecting a directory to search, means for selecting a language for the multi-language text analysis, means for starting the multi-language text analysis, and means for viewing a report for listing a text matching the search topic.

12. A computer program product comprising one or more computer-readable instructions configured to cause one or more computer processors to execute the steps recited in claim 1.

13. A computer system comprising one or more computer processors configured to execute the steps recited in claim 1.

14. A system for domain-independent natural language understanding, comprising:
   means for forming pairs of words and/or phrases in independent phrases in a sentence, wherein each word and/or phrase is paired with every other word and/or phrase;
   means for determining meanings for the words and/or phrases by assigning numeric codes from the pre-existing class and category structure that uniquely identify semantic concepts;
   means for adjusting the numeric codes using a weighting component;
   means for storing the adjusted numeric codes that uniquely identify semantic concepts;
   means for comparing the adjusted numeric codes that uniquely identify semantic concepts of each word and/or phrase with each adjusted numeric code that uniquely identifies the semantic concept of the other word and/or phrase in the pair;
   comparing syntactically identical sentences with a potential idiom that changes adjusted numeric codes that uniquely identify semantic concepts depending on the context using an ontology;
   means for determining whether a potential idiom is identified and employing appropriate class and category structure to calculate a first adjusted numeric code total, wherein said first adjusted numeric code total corresponds to the best word and/or phrase pairings;
   means for determining an overall-adjusted numeric code total based on said first adjusted numeric code total by comparing remaining words in a sentence and selecting the pairs adjusted numeric codes that uniquely identify semantics concepts with the best relationships based on numerical comparisons;
   means for selecting the pairs with the best relationships based on numerical comparisons;
   means for storing the pairs;

means for combining highly-related pairs with other highly-related pairs to form longer groups of adjusted numeric codes that uniquely identify semantic concepts;

means for exchanging adjusted numeric codes that uniquely identify semantic concepts for the longer groups with adjusted numeric codes that uniquely identify semantic concepts having a weaker relationship to determine if the exchanged adjusted numeric codes that uniquely identify semantic concepts provide an overall stronger relationship based on numerical comparisons;

means for forming longer and longer groups until the adjusted numeric codes that uniquely identify semantic concepts are selected in context for all words and phrases in the sentence; and means for relating the adjusted numeric codes that uniquely identify semantic concepts to words and phrases.

15. The system of claim 14, wherein the system is configured for performing language-independent semantic analysis.

16. The system of claim 14, wherein the forming means includes means for forming legitimate pairs of the words and/or the phrases in the independent phrases in the sentence.

17. The system of claim 14, wherein selecting means includes means for selecting a same word, with different adjusted numeric codes that uniquely identify semantic concepts, multiple times, if more than one pair has a strong relationship.

18. The system of claim 14, further comprising means for analyzing the words and/or phrases of the groups to determine possible adjusted numeric codes that uniquely identify semantic concepts based on a pre-existing numeric class and category structure.

19. The system of claim 14, wherein the system is configured for performing machine translation.

20. The system of claim 14, wherein the system is configured for performing concept determination.

21. The system of claim 20, wherein the concept determination is configured for implementing message routing, and/or a search tool for finding text referring to a topic of interest.

22. The system of claim 14, further comprising employing the system for performing multi-language text analysis.

23. The system of claim 22, further comprising a graphical user interface for performing the multi-language text analysis.

24. The system of claim 23, wherein the graphical user interface includes a search topic field for entering a search topic, a topic clarification field for entering a word for clarifying the search topic, means for selecting a directory to search, means for selecting a language for the Multilanguage text analysis, means for starting the multi-language text analysis, and means for viewing a report for listing a text matching the search topic.

25. The system of claim 14, wherein the means for determining, the means for comparing, the means for selecting, the means for combining, the means for exchanging, and the means for forming comprise one or more devices of a computer system.

26. The system of claim 14, wherein the means for determining, the means for comparing, the means for selecting, the means for combining, the means for exchanging, and the means for forming comprise one or more computer-readable instructions stored on a computer readable medium.

27. A computer program product for domain-independent natural language understanding, including one or more computer readable instructions embedded on a computer readable medium and configured to cause one or more computer processors to perform the steps of:

forming pairs of words and/or phrases in independent phrases in a sentence, wherein each word and/or phrase is paired with every other word and/or phrase;

determining meanings for the words and/or phrases;

assigning a numeric code from the pre-existing class and category structure that uniquely identifies the semantic concept to each meaning;

adjusting the numeric codes using a weighting component;

storing the adjusted numeric codes that uniquely identify semantic concepts in a computer memory;

comparing the adjusted numeric codes that uniquely identify semantic concepts of each word and/or phrase with each adjusted numeric code that uniquely identifies the semantic concept of the other word and/or phrase in the pair;

comparing syntactically identical sentences with a potential idiom that changes adjusted numeric codes that uniquely identify semantic concepts depending on the context using an ontology;

determining whether a potential idiom is identified and employing appropriate class and category structure to calculate a first adjusted numeric code total, wherein said first adjusted numeric code total corresponds to the best word and/or phrase pairings;

determining an overall-adjusted numeric code total based on said first adjusted numeric code total by comparing remaining words in a sentence and selecting the pairs of adjusted numeric codes that uniquely identify semantic concepts with the best relationships based on numerical comparisons;

selecting the pairs of adjusted numeric codes that uniquely indentify semantic concepts with the best relationships based on numerical comparisons would be considered a better relationship than codes 4 and 10;

storing the pairs in the computer memory;

combining highly-related pairs with other highly-related pairs to form longer groups of adjusted numeric codes that uniquely identify semantic concepts;

exchanging adjusted numeric codes that uniquely identify semantic concepts for the longer groups with adjusted numeric codes that uniquely identify semantic concepts having a weaker relationship to determine if the exchanged adjusted numeric codes that uniquely identify semantic concepts provide an overall stronger relationship based on numerical comparisons;

forming longer and longer groups until the adjusted numeric codes that uniquely identify semantic concepts are selected in context for all words and phrases in the sentence; and relating the adjusted numeric codes that uniquely identify semantic concepts to words and phrases.

* * * * *